UNITED STATES PATENT OFFICE.

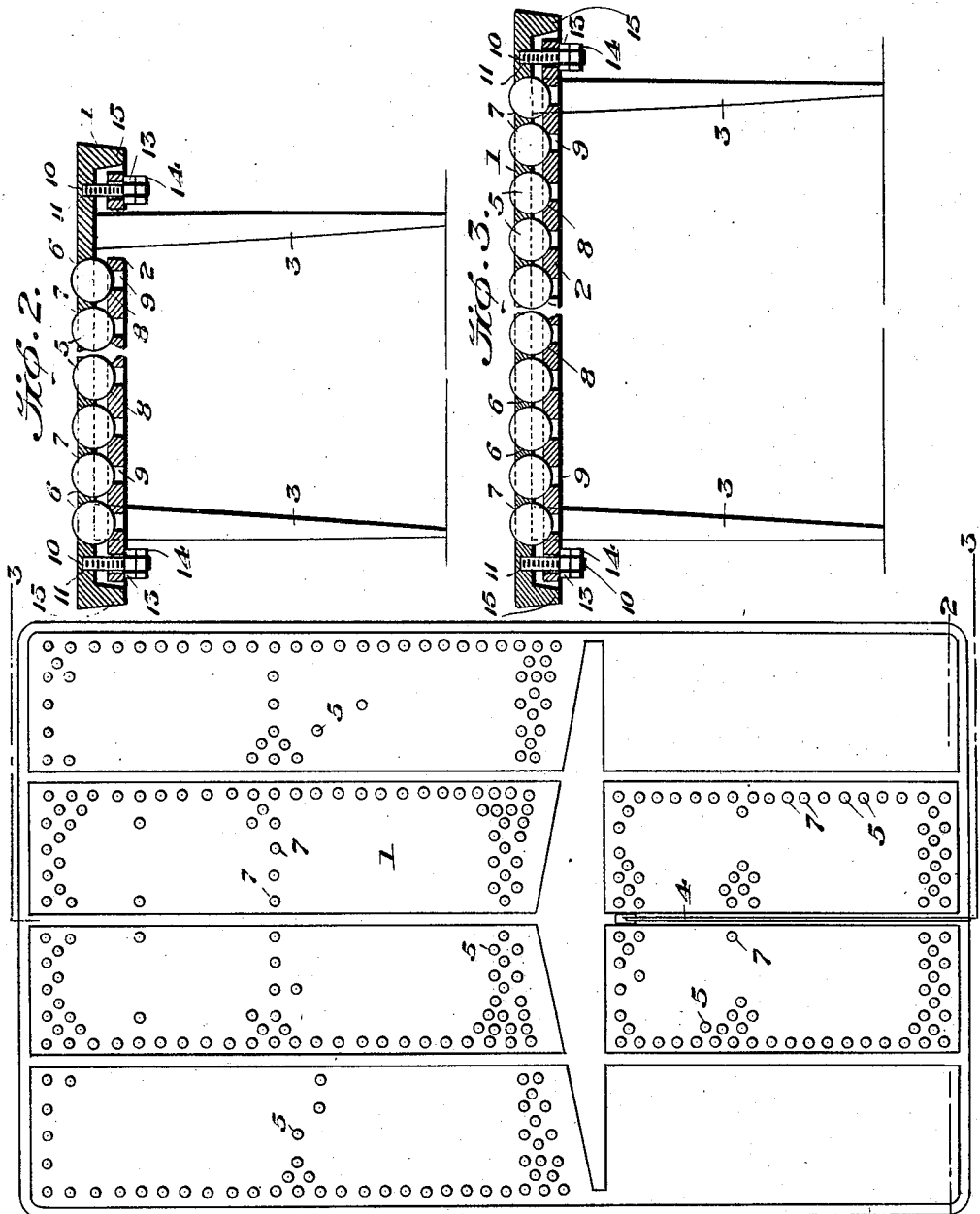

ROBERT BLACK AND WILBER I. FRANCIS, OF EVANSVILLE, INDIANA.

BALL-BEARING TABLE FOR SAWING-MACHINES.

1,390,487. Specification of Letters Patent. Patented Sept. 13, 1921.

Application filed May 26, 1920. Serial No. 384,314.

*To all whom it may concern:*

Be it known that we, ROBERT BLACK and WILBER I. FRANCIS, citizens of the United States, residing at Evansville, in the county of Vanderburg and State of Indiana, have invented certain new and useful Improvements in Ball-bearing Tables for Sawing-Machines, of which the following is a specification.

This invention relates to ball bearing tables or work supports for band sawing machines.

Our object is to provide an improved ball bearing table or work support which will minimize the labor incidental to feeding timber across the ordinary smooth flat table, such as is commonly used on band sawing machines and, as incidental thereto, relieve the saw of a large portion of the strain to which it is subject.

Our improvements reside in the manner of mounting the balls, provision for clearing the ball containers or holes of sawdust and dirt, and in mounting the balls on a special under-table which is adjustable in relation to the main or upper table for the purpose of accommodating balls of any size desired and to permit proper setting so that the balls will all turn freely without binding.

It is not of the essence of our invention that the table be of any particular size, nor that the exact area of the table disclosed in the drawings be provided with balls nor that the invention be applied to a band sawing machine as it may be used as a work support on other types of wood sawing machinery.

The embodiment of the invention hereinafter described and which is shown in the accompanying drawings is to be considered as illustrative, rather than restrictive, of the scope of the invention, as modifications may be resorted to without departing from the essential principle thereof.

In the accompanying drawings,

Figure 1 is a plan view of the table, and

Figs. 2 and 3 are cross sections on the lines 2—2 and 3—3 of Fig. 1, respectively.

The main or upper table is shown at 1, the lower or under table appears at 2, and the legs or frame which supports upper table 1 appears at 3. The saw is shown at 4.

As much of the area of the tables 1 and 2 as may be desired or found necessary, can be provided with the balls 5. In the arrangement shown in Fig. 1, practically the entire rear part of the table is provided with the balls 5, but it is not necessary to provide the entire front part of the table with the balls. Those sections of the table at the center of the front portion thereof are provided with balls. The remaining part of the front section of the table may, or may not, be provided with the balls 5.

The table 1 is provided with ball concavities 6 which have small openings 7 through the upper surface thereof so that only a small part of each ball will project above the upper surface of table 1 to serve as a support for the work being sawed.

The under table 2 has concavities 8 in its upper face corresponding to the concavities 6. The table 2 also has openings 9 which lead from the bottoms of the concavities 8 through the lower surface of said table 2. These openings 9 are for the purpose of voiding the sawdust and refuse so that it may work out of the ball sockets 8 and not interfere with the free turning of the balls 5.

Our invention contemplates the relative adjustability of the tables 1 and 2. A convenient means for raising or lowering the table 2 in relation to the table 1 comprises the screws 10 which are screwed into threaded sockets 11 at the corners of the table 1 and pass freely through holes in the corners of the table 2. Adjusting nuts 13 and jam or locking nuts 14 are provided on the screws 10. The table 1 is provided with a depending flange 15 which overhangs the edge of the table 2.

By adjusting the table 2 the balls 5 can be set so that they will turn freely yet without lost motion; furthermore, the adjustable connection enables such freedom of turning by the balls as will enable the sawdust and refuse to work out through the holes 9.

The operator, standing at the front of the machine, is enabled to easily push the timber, or other piece of work, across the table and against the saw 4 and the ease with which the work may be propelled prevents the operator from unconsciously unduly twisting, and deflecting the saw 4, resulting in better sawing with less effort than with a table which is not equipped with balls.

What we claim is:—

1. A work supporting table for power saws comprising an upper table having ball sockets extending through the upper surface thereof, means supporting said table, an under-table having ball sockets, balls in the sockets of the respective tables and which project above the upper surface of the upper table, and means adjustably suspending the under table from the upper table.

2. A work supporting table for power saws comprising an upper table having ball sockets extending through the upper surface thereof, means supporting said table, an under-table having ball sockets, balls in the sockets of the respective tables and which project above the upper surface of the upper table, and means adjustably suspending the under table from the upper table, comprising screws depending from the upper table and passing through holes in the under-table, and adjusting and jam nuts on said screws on which the under-table rests.

3. A work supporting table for power saws comprising an upper table having ball sockets extending through the upper surface thereof, an under-table having ball sockets, said under-table having its ball sockets opening through its lower face for the purpose of discharging sawdust and refuse, and means adjustably suspending the under-table from the upper table.

In testimony whereof we affix our signatures.

ROBERT BLACK.
WILBER I. FRANCIS.